UNITED STATES PATENT OFFICE.

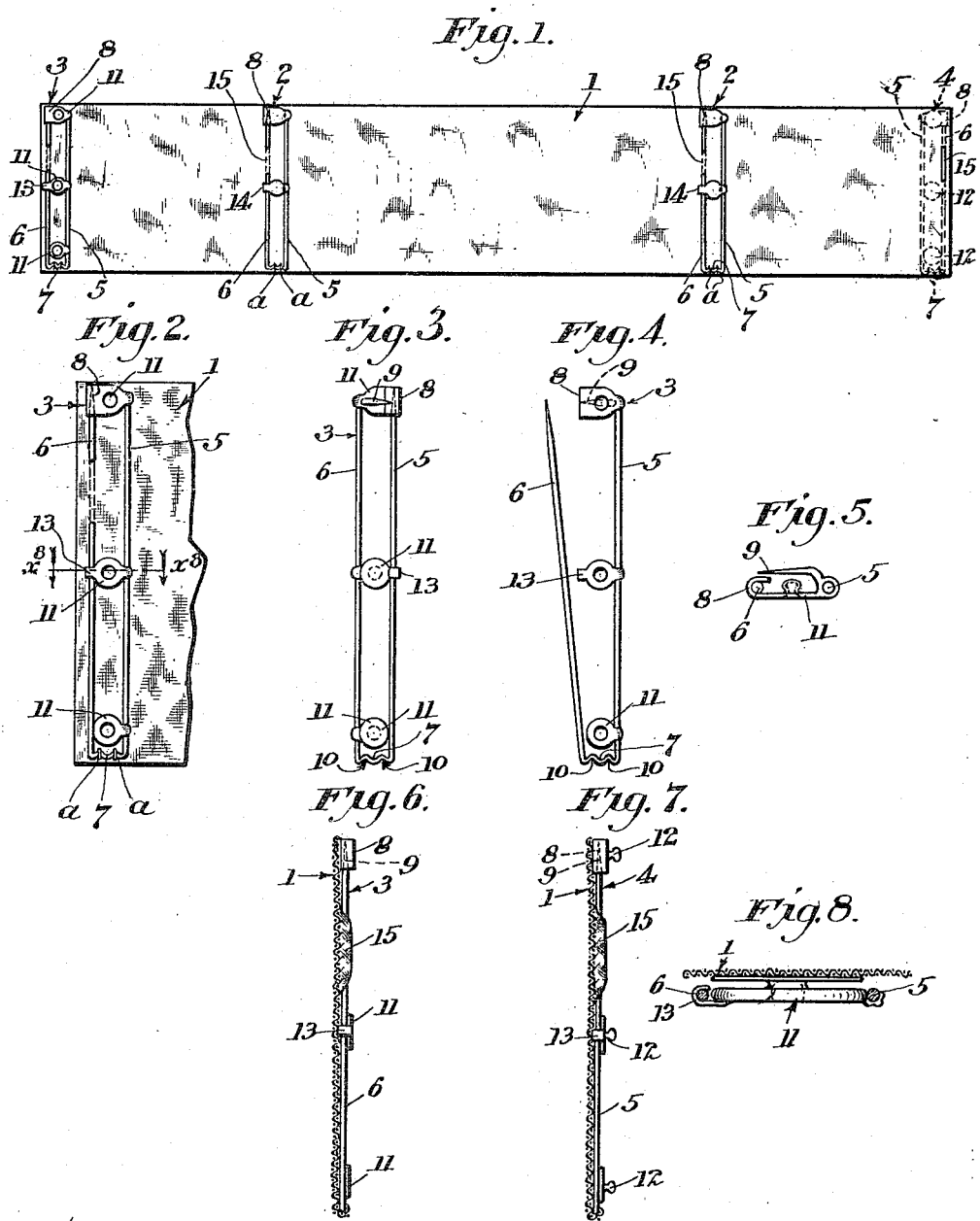

TILLIE A. ENNIS, OF LOS ANGELES, CALIFORNIA.

COLLAR SUPPORT AND FASTENER.

1,296,783.  Specification of Letters Patent.  Patented Mar. 11, 1919.

Application filed January 16, 1918. Serial No. 212,134.

*To all whom it may concern:*

Be it known that I, TILLIE A. ENNIS, a citizen of the United States, residing at Los Angeles, in the county of Los Angeles and State of California, have invented a new and useful Collar Support and Fastener, of which the following is a specification.

This invention relates to devices for supporting a collar and for fastening the ends of the collar together.

An object of the invention is to produce a device of this character which can be readily fastened to and unfastened from a collar.

Another object is to make provision for holding the support in place on the collar so that the collar will not slip up on the support.

Other objects and advantages will appear in the subjoined detail description.

The accompanying drawings illustrate the invention:

Figure 1 is an elevation of a collar and the supports embodying the invention in position on the collar.

Fig. 2 is an enlarged view of the left-hand end of Fig. 1.

Fig. 3 is a rear view of the support shown in Fig. 1.

Fig. 4 is an elevation of the support shown in Fig. 2, said support being in open position.

Fig. 5 is a plan view of Fig. 2 omitting the collar.

Fig. 6 is an edge view from the left of Fig. 1.

Fig. 7 is an edge view from the right of Fig. 1.

Fig. 8 is a plan view partly in section on line indicated by $x^8$—$x^8$, Fig. 2.

A collar to be supported is indicated at 1 and fastened thereto are supports 2, 3, 4. Each of the supports comprises a U-shaped pin having relatively long arms 5, 6 and an intermediate web 7 joining the arms 5, 6 together. The arm 5 forms the back of the pin and the arm 6 is sharpened and forms a penetrating member adapted to be pinned through the material of which the collar is made. The back 5 is provided at its free end with a hook 8 which is adapted to engage the pin arm 6 after the manner of a safety pin hook so as to hold the pin arms in closed position. Projecting from the hook 8 is a pointed penetrating member 9 adapted to be pinned into the material, said member extending transversely to the arms 5, 6.

The pin web 7 is provided with spaced inwardly projecting notches 10 so that, when the pin arm 6 is pinned through the collar, portions *a* thereof will engage the notches 10.

The supports 3, 4 are provided with coöperating fastening means in the form of snap fasteners, the support 3 having the socket members 11 of the snap fasteners and the support 4 having the stud members 12 of the snap fasteners. In the instance shown the hook 8 of the support 3 is integral with one of the socket members 11, another socket member 11 is positioned near the opposite end of the fastener, and there is a third one of the socket members 11 substantially midway of the supports 3, 4. These socket members 11 are securely fastened to the pin back 5 by any suitable means and the intermediate socket member 11 is preferably provided with a hook 13 adapted to engage the pin arm 6 the same as does the hook 8.

The hook 8 of the fastener 4 is integral with one of the fastener stud members 12, and there is another of the fastener stud members positioned near the opposite end of the pin arms 5, 6, and there is also another of the stud members 12 positioned intermediate of the ends of the pin arms. The stud members 12 are secured to the pin back 5 by any suitable means and the intermediate fastener stud member is provided with a hook 14 adapted to engage the pin arm 6 the same as the hook 8. The supports 2 may be provided intermediate of their ends with hooks 14 to engage the arms 6.

From the foregoing it is clear that the supports are of like construction with the exception that the intermediate supports 2 are not, or at least need not be, provided with the snap fasteners 11, 12, and the support 3 is provided with the snap fastener socket members 11, whereas the support 4 is provided with the snap fastener stud members 12.

In practice each of the supports 2, 3, 4 will be pinned through the lower edge of the collar 1, as shown in Fig. 1, so as to catch relatively small portions *a* and the pin arm 6 will be pinned through the collar as indicated at 15, thus bringing the notches 10 into registration with the caught portions *a* of the collar, and the pin member 6 will be latched beneath the hook 8. The supports 2

(as many as deemed desirable) will be placed, for instance, at those portions of the collar adjacent the side of the neck of the wearer, and the support 3 will be placed on one side of the collar at one end thereof, and the support 4 will be placed on the opposite side of the collar at the opposite end thereof. The pin member 9 of each support will be pinned through the material to fasten the upper end of the support to the collar. Thus it is clear that both ends of the supports will be securely attached, without sewing, to the collar and that relative slipping between the collar and support cannot occur.

When the supports 2, 3, 4 are in place, as shown in Fig. 1, the collar will be placed in position around the wearer's neck and the ends joined and securely fastened by snapping together the fastener members 11, 12.

When the collar becomes soiled it is an easy matter to detach the supports therefrom so that the collar can be cleaned or laundried.

I claim:

1. In a collar support, a U-shaped pin having straight arms of substantially equal length, a hook at the open end of the pin fastened to one arm and adapted to releasably engage the other arm, a second hook fastened to the first arm near the middle thereof and adapted to releasably engage said other arm, and means at both ends of the pin to fasten it to a collar.

2. In a collar support, a pair of U-shaped pins having straight arms of substantially equal length, snap fastener socket members fastened to one of the arms of one pin, there being one such member at each end of the pin and one near the middle thereof, snap fastener stud members fastened to one of the arms of the other pin, there being one such stud member at each end of said other pin and one over the middle thereof, and hooks on the socket and stud members at the open ends and at the middle of the respective pins adapted to engage the other arms of the pins respectively, the hooks at the open end of the pins being on the opposite sides of the sockets and stud members from the sides having the sockets and studs.

Signed at Los Angeles, California, this 8th day of January, 1918.

TILLIE A. ENNIS.

Witnesses:
GEORGE H. HILES,
L. BELLE WEAVER.

Copies of this patent may be obtained for five cents each, by addressing the "Commissioner of Patents, Washington, D. C."